Feb. 23, 1971 E. RÖSS 3,565,806
MANGANESE ZINC FERRITE CORE WITH HIGH INITIAL PERMEABILITY
Original Filed Nov. 16, 1966
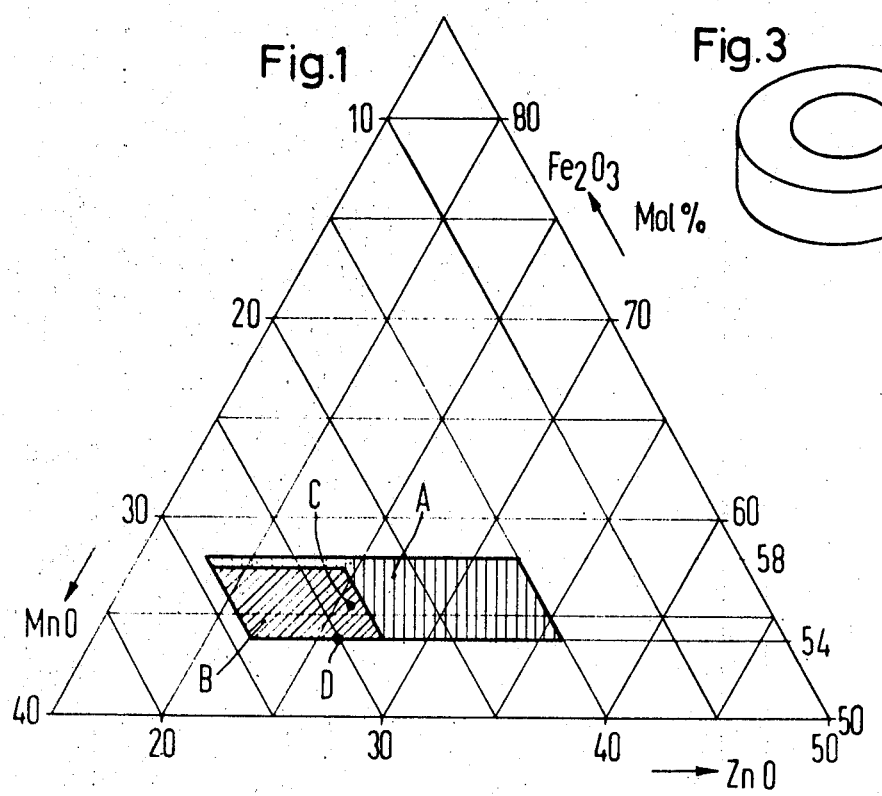
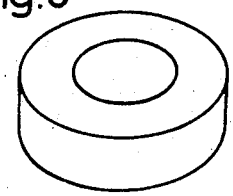
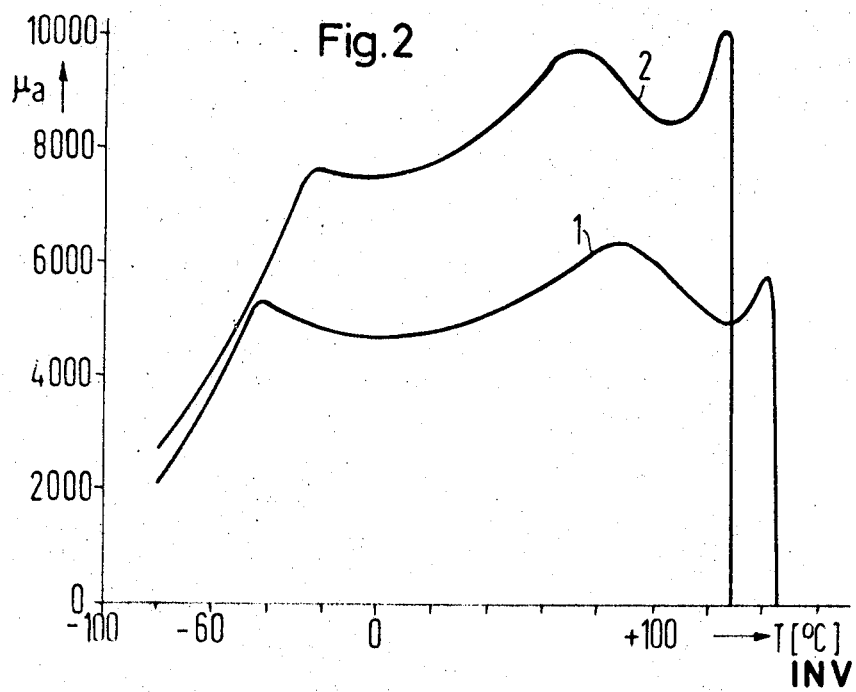
INVENTOR
Erich Röss
BY
ATTYS.

United States Patent Office 3,565,806
Patented Feb. 23, 1971

3,565,806
MANGANESE ZINC FERRITE CORE WITH
HIGH INITIAL PERMEABILITY
Erich Röss, Munich, Germany, assignor to Siemens Aktiengesellschaft, Berlin and Munich, Germany, a German corporation
Continuation of application Ser. No. 594,931, Nov. 16, 1966. This application Jan. 23, 1970, Ser. No. 6,028
Claims priority, application Germany, Nov. 23, 1965, S 100,615
Int. Cl. C04b 35/38
U.S. Cl. 252—62.62
12 Claims

ABSTRACT OF THE DISCLOSURE

A ferromagnetic structural element having initial permeability higher than 4000 in the operating temperature range of −50° C. to +120° C. composed of 54 to 58 mol percent of $Fe_2O_3$ 10 to 24 mol percent of MnO and 18 to 36 mol percent of ZnO and containing less than 0.05% by weight of impurities and a method of manufacturing the same. The method includes mixing the above components and sintering them at 1270° C. to 1300° C. for 4 to 20 hours, with at least the last half of the sintering taking place in an inert atmosphere having less than 0.2% by volume of oxygen and cooling the sintered ferrite to about 300° C. in the same inert atmosphere.

---

This is a continuation application of U.S. Ser. No. 594,931, filed Nov. 16, 1966 (now abandoned).

Ferromagnetic structural elements which have as high as possible an initial permeability are required in wide band transmitters, pulse transmitters, power transmitters with high frequencies and the like. With use of such devices in, for example, refrigerating units, space vehicles, measuring probes or in the utilization of such devices in open terrain having a continental climate with great temperature fluctuation between summer and winter causes extreme demands to be made on these instruments, especially on their permeability constancy over a great temperature range. Thus, these structural elements should have, both at relatively low temperatures, for example at −50° C., and also at relatively high temperatures of more than 100° C., a high initial permeability. Further within this range, no great differences in permeability should exist.

Manganese-zinc-ferrite cores having high initial permeability over a temperature differential of several 10° C. are known, such as are described, for example, in the publication "Zeitschrift für angewandte Physik, 1961," in particular on page 248. It has been ascertained that the manganese-zinc-ferrite cores there described are only conditionally usable at low temperatures. If the initial permeability is still relatively high at temperatures around, say, 100° C., such permeability drops very considerably, namely, at temperatures below, say, 0° C. It is already a known practice, on the other hand, through the reduction of the Curie temperature to produce ferrite cores of this type which are highly permeabile at low temperatures. The disadvantage then exists in these ferrites in that their useful range in the direction of higher temperature is limited in the neighborhood of 60° C.

Accordingly, it is an important object of the invention to increasing the useful range of highly permeable manganeze-zinc-ferrite cores whereby they exhibit a high initial permeability of more than 4000 in a temperature range from about −50° C. to +120° C. Such ferrite cores also are capable of functioning in the instruments indicated above without the aid of additional compensation members.

Other objects, features and advantages of the invention will be readily apparent from the following detailed description of certain preferred embodiments thereof, although variations and modifications may be effected without departing from the spirit and scope of the novel concepts of the disclosure. The invention proceeds from the further concept that through an increase of the iron oxide constituent within a certain mixture range of the $$MnO\text{-}ZnO\text{-}Fe_2O_3$$

diagram, in addition to the primary maximum located directly below the Curie temperature and the secondary maximum located at intermediate temperatures, there occurs a tertiary permeability maximum.

The invention thus is directed to the use of manganese-zinc-ferrites in a composition comprising with reference to quantity,

| | Mol percent |
|---|---|
| $Fe_2O_3$ | 54–58 |
| MnO | 10–24 |
| ZnO | 18–36 | as ferromagnetic with a high initial permeability of more than 4000, in particular more than 5000, for electromagnetic elements to be operated at temperatures between −50° C. and +130° C.

Especially suitable for these purposes are ferrite cores within the following composition range:

| | Mol percent |
|---|---|
| $Fe_2O_3$ | 54–57.5 |
| MnO | 18–24 |
| ZnO | 18–28 |

Importance is here placed on the feature that the starting materials embodied in the ferrite formation are present in great purity, with the total impurities amounting to less than 0.05% by weight, in particular to less than 0.02% by weight. In accordance with another development of the invention, there is presented a novel process for the production of manganese-zinc-ferrite cores which are highly permeable over a large temperature range, in which a mixture of the pure starting substances with less than 0.05% total impurities by weight, preferably less than 0.02% by weight, is utilized in the above indicated mixing range and is sintered, preferably at temperatures between 1270 and 1300° C., for about 4 to 20 hours. The sintering takes place at least during half the sintering time, and especially in the latter half of the sintering time, in an inert gas atmosphere. It is already a known practice to use as an inert gas atmosphere nitrogen which contains less than 0.02 volumetric percent oxygen.

The invention will be explained in greater detail in connection with the drawings, in which:

FIG. 1 represents the three substance diagram $Fe_2O_3$-MnO-Zno;

FIG. 2 is a chart illustrating the relationship between permeability and temperature of ferrites in accordance with the invention; and FIG. 3 is a perspective view of a core of the type to which the invention may be applied.

In the diagram of FIG. 1, reference letter A designates the composition range of manganese-zinc-ferrite cores which fulfill extremely well the solution to the problem underlying the invention. Reference letter B designates a smaller range lying within the first mentioned range, in which the initial permeability of ferrites falling therein is relatively great over a large temperature range. Likewise, reference letters C and D designate the composition points involved in the following examples:

EXAMPLE 1

A homogeneous oxide mixture was produced of the following composition, in which the constituent of impurities not forming ferrite amounted to less than 0.02% by weight:

| | Mol. percent |
|---|---|
| $Fe_2O_3$ | 55.5 |
| MnO | 18.5 |
| ZnO | 26 |

This oxide mixture was calcined for one hour at 850° C., then finely ground and pressed into ring cores with an external diameter of 18 mm., an internal diameter of 10 mm., and a core height of 6 mm. Such pressed pieces were then sintered for 2 hours in air and thereafter for 5 hours in pure nitrogen, with less than 0.02 vol. percent oxygen, at 1270° C. Cooling to 400° C. was then carried out within the same nitrogen atmosphere in about an hour.

The composition corresponding to point C in FIG. 1, according to the process described in this example, results in a highly permeable ferrite core, whose function of initial permeability in dependence on the temperature is represented in FIG. 2 as curve 1. From this curve it is obvious that the permeability has maxima at +140° C. (primary maximum), at +85° C. (secondary or first secondary maximum), and at −40° C. (tertiary or second secondary maximum). The Curie temperature amounts to 145° C. Such a core, therefore has an initial permeability of $\mu_a = 5500 \pm 20\%$ over a temperature range from −50° C. to +140° C.

EXAMPLE 2

In accordance with point D of FIG. 1, there is produced, corresponding to the Example 1, a ferrite core of the following composition according to the same process:

| | Mol percent |
|---|---|
| $Fe_2O_3$ | 54 |
| MnO | 20 |
| ZnO | 26 |

In FIG. 2 the function of the initial permeability in dependence on the temperature of this ferrite core is represented by the curve 2. According thereto this core has a Curie temperature of 128° C. and the following maxima of the initial permeability:

+125° C.
+70° C.
−25° C.

The initial permeability extends over a temperature range somewhat smaller than in the first example but still extremely great, namely between −30° C. and +120° C. to:

$$\mu_a = 8500 \pm 20\%$$

EXAMPLE 3

An oxide of the same general composition as in Example 2, and represented by the point D of FIG. 1, after the same preliminary treatment is sintered at 1290° C. for two hours in air and then for two hours in nitrogen. The cooling to about 300° C. takes place in five hours, likewise in a nitrogen atmosphere.

Through a sintering treatment varied in this manner the tertiary or second secondary maximum of the initial permeability is shifted to a far lower temperature, namely to −70°. The secondary or first secondary maximum has shifted merely by about 5° to +65° C. While the initial permeability of a ferrite core produced in this manner amounts to only 5000±20%, this very considerable initial permeability, however, is achieved over a very great temperature range from −80° C. to +120° C.

FIG. 3 illustrates a type of ferrite core which may be produced in accordance with the invention, constructed as a ring core. Such a ring core is especially useful as a transformer and for this purpose would be provided with windings, such windings, however, not being illustrated in the figure.

I claim:

1. A ferromagnetic manganese-zinc ferrite composed essentially of 54 to 58 mol percent of $Fe_2O_3$, 10 to 24 mol percent of MnO and 18 to 36 mol percent of ZnO and containing less than 0.05% by weight of impurities, said ferrite having an initial permeability higher than 4000 over an operating temperature range of −50° C. to +120° C.

2. A ferromagnetic manganese-zinc ferrite as defined in claim 1, wherein the ferrite is composed essentially of 54 to 57.5 mol percent of $Fe_2O_3$, 18 to 24 mol percent of MnO and 18 to 28 mol percent of ZnO.

3. A ferromagnetic manganese-zinc ferrite as defined in claim 1, wherein the ferrite is composed essentially of 54.5 mol percent of $Fe_2O_3$, 19.5 mol percent of MnO and 26 mol percent of ZnO.

4. A ferromagnetic manganese-zinc ferrite as defined in claim 1, wherein the ferrite is composed essentially of 55.5 mol percent of $Fe_2O_3$, 18.5 mol percent of MnO and 26 mol percent of ZnO.

5. A ferromagnetic manganese-zinc ferrite as defined in claim 1, wherein the ferrite is composed essentially of 54 mol percent of $Fe_2O_3$, 20 mol percent of MnO and 26 mol percent of ZnO.

6. A method of producing a manganese-zinc ferrite having an initial permeability higher than 4000 over the operating temperature range of −50° C. to +120° C. comprising (1) providing a substantially uniform mixture of 54 to 58 mol percent of $Fe_2O_3$, 10 to 24 mol percent of MnO and 18 to 36 mol percent of ZnO, said mixture having less than 0.05% by weight of impurities, (2) forming ferrite blanks from said mixture, (3) sintering said ferrite blanks at a temperature in the range of about 1270° C. to 1300° C. for a time period of about 4 to 20 hours, and at least during the last half of said time period the sintering occurring in an inert gas atmosphere containing less than 0.02% by volume of oxygen, and (4) cooling said sintered ferrite blanks to a temperature of about 300° C. in said inert atmosphere.

7. The method as defined in claim 6, wherein (4) cooling of the sintered ferrite blanks takes place in a pure nitrogen atmosphere.

8. The method as defined in claim 6, wherein (4) cooling of the sintered ferrite blanks to about 300° C. occurs in 1 to 5 hours.

9. The method as defined in claim 6, wherein (3) sintering of the ferrite blanks at a temperature in the range of about 1270° C. to 1300° C. during the time period occurs at least partially in ambient atmosphere.

10. The ferromagnetic manganese-zinc ferrite of claim 1 having an initial permeability of at least 5500±20% over an operating temperature range of −50° C. to +140° C. comprised of a primary maximum of at least about 5750 at about 140° C., a secondary maximum of at least about 6000 at about 85° C. and a tertiary maximum of at least about 5250 at about −40° C.

11. The ferromagnetic manganese-zinc ferrite of claim 1 having an initial permeability of at least 8500±20% over an operating temperature range of −30° C. to +120° C. comprised of at primary maximum of at least about 10,000 at about 125° C., a secondary maximum of at least about 9000 at about 70° C. and a tertiary maximum of at least about 7000 at about −25° C.

12. A ferromagnetic manganese-zinc ferite having an initial permeability of at least 5000±20% over an operating temperature range of −80° C. to +120° C. composed of about 54 mol percent $Fe_2O_3$, 20 mol percent MnO and 26 mol percent ZnO with less than 0.02% by weight of impurities.

References Cited

UNITED STATES PATENTS

| | | | |
|---|---|---|---|
| 2,924,573 | 2/1960 | Sasaki et al. | 252—62.62 |
| 3,027,327 | 3/1962 | Blank | 252—62.62 |

FOREIGN PATENTS

| | | | |
|---|---|---|---|
| 965,094 | 7/1964 | Great Britain | 252—62.62 |
| 1,175,137 | 7/1964 | Germany | 252—62.62 |
| 1,347,584 | 11/1963 | France | 252—62.62 |
| 1,353,715 | 1/1964 | France | 252—62.62 |
| 1,353,716 | 1/1964 | France | 252—66.62 |

TOBIAS E. LEVOW, Primary Examiner

R. D. EDMONDS, Assistant Examiner